(12) United States Patent
Wang et al.

(10) Patent No.: US 12,331,631 B2
(45) Date of Patent: Jun. 17, 2025

(54) ACOUSTIC NOISE SOURCE LOCALIZATION BASED ON CROSS-CORRELATION FUNCTIONS ACROSS A HYDROPHONE ARRAY

(71) Applicant: Halliburton Energy Services, Inc., Houston, TX (US)

(72) Inventors: Yadong Wang, Singapore (SG); Xiang Wu, Singapore (SG)

(73) Assignee: Halliburton Energy Services, Inc., Houston, TX (US)

(*) Notice: Subject to any disclaimer, the term of this patent is extended or adjusted under 35 U.S.C. 154(b) by 377 days.

(21) Appl. No.: 17/890,153

(22) Filed: Aug. 17, 2022

(65) Prior Publication Data
US 2023/0313676 A1 Oct. 5, 2023

Related U.S. Application Data

(60) Provisional application No. 63/324,906, filed on Mar. 29, 2022.

(51) Int. Cl.
*E21B 47/107* (2012.01)
*E21B 47/005* (2012.01)
(Continued)

(52) U.S. Cl.
CPC .......... *E21B 47/107* (2020.05); *E21B 47/005* (2020.05); *E21B 47/14* (2013.01); *G01V 1/44* (2013.01)

(58) Field of Classification Search
CPC ...... E21B 47/107; E21B 47/005; E21B 47/14; G01V 1/44; G01V 1/46; G01V 1/48
See application file for complete search history.

(56) References Cited

U.S. PATENT DOCUMENTS

2006/0015256 A1  1/2006  Hassan et al.
2015/0112596 A1  4/2015  Collins
(Continued)

FOREIGN PATENT DOCUMENTS

CN      110488253 A  * 11/2019  ............ G01S 7/539
WO  WO-2012168679 A1  * 12/2012  ............ E21B 43/119

OTHER PUBLICATIONS

Hill, Freeman; Bond, Andy; Biery, Michael; Jagannathan, Srinivasan; Walters, Darren; Lu, Yinghui ( ). [Society of Petroleum Engineers SPE Annual Technical Conference and Exhibition—Dubai, UAE (Sep. 26, 2016)] SPE Annual Technical Conference and Exhibition—Methodology and Array Technology for Finding and Describing Leaks in a Well.

(Continued)

*Primary Examiner* — Ryan D Walsh
(74) *Attorney, Agent, or Firm* — John Wustenberg; C. Tumey Law Group PLLC

(57) ABSTRACT

A method for acoustic noise source detection. The method may comprise disposing an acoustic logging tool into a wellbore, performing an acoustic logging operations in the wellbore with the acoustic logging tool, forming a data set form the acoustic logging operation, and performing a cross-correlation function between pairs of hydrophones using the data set. The method may further comprise construction a cost function using at least in part the cross-correlation function to find a noise source distribution and identifying a location of the acoustic noise source by inverting the noise source distribution.

20 Claims, 11 Drawing Sheets

(51) Int. Cl.
*E21B 47/14* (2006.01)
*G01V 1/44* (2006.01)

(56) References Cited

U.S. PATENT DOCUMENTS

| | | |
|---|---|---|
| 2016/0209539 A1 | 7/2016 | Le Calvez et al. |
| 2017/0356286 A1* | 12/2017 | Nguyen .................. G01V 1/50 |
| 2018/0176679 A1 | 6/2018 | Lu et al. |
| 2020/0278464 A1 | 9/2020 | Aslanyan et al. |
| 2021/0055436 A1 | 2/2021 | Wu et al. |
| 2021/0109243 A1 | 4/2021 | Ge et al. |
| 2021/0199829 A1 | 7/2021 | Wu et al. |
| 2021/0222551 A1 | 7/2021 | Jin et al. |
| 2021/0396126 A1 | 12/2021 | Wang et al. |
| 2021/0396900 A1 | 12/2021 | Wang et al. |
| 2021/0404320 A1 | 12/2021 | Jin et al. |
| 2021/0405231 A1 | 12/2021 | Wu et al. |
| 2021/0405232 A1 | 12/2021 | LeBlanc et al. |
| 2022/0065085 A1 | 3/2022 | Shetty et al. |
| 2022/0136385 A1 | 5/2022 | Wang et al. |
| 2023/0313676 A1* | 10/2023 | Wang .................. E21B 47/107 166/250.01 |
| 2023/0314647 A1* | 10/2023 | Wu .......................... G01V 1/46 367/15 |

OTHER PUBLICATIONS

International Search Report and Written Opinion for PCT/US2022/042522 dated Dec. 20, 2022.

* cited by examiner

ACOUSTIC NOISE SOURCE LOCALIZATION BASED ON CROSS-CORRELATION FUNCTIONS ACROSS A HYDROPHONE ARRAY

BACKGROUND

For oil and gas exploration and production, a network of wells, installations and other conduits may be established by connecting sections of metal pipe together. For example, a well installation may be completed, in part, by lowering multiple sections of metal pipe (i.e., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

A growing concern in the life of an oil or gas well is the pressure buildup in its annuli. Near wellbore fluid flows can be caused by leakages on casing or tubing, channels in the cement, fractures in the formation, or active reservoir. The knowledge of flow locations and distributions is critical for remedial and production management operations, e.g., repairing wellbore leakages, identifying water sources and sealing water entrances, re-perforating unactive production intervals, etc. Localizing the flows using an acoustic logging tool presents enormous challenge to petroleum engineers.

BRIEF DESCRIPTION OF THE DRAWINGS

These drawings illustrate certain aspects of some examples of the present disclosure and should not be used to limit or define the disclosure.

DETAILED DESCRIPTION

This disclosure may generally relate to methods and systems for capturing and recording noise in a wellbore and determining the location of the noise source. As discussed below, the methods and systems may perform a cross-correlation between data from pairs of hydrophones. Using the cross-correlation, a cost function may be constructed, which may be utilized to invert measurements from an acoustic logging tool to determine a noise source distribution.

Figure 1:
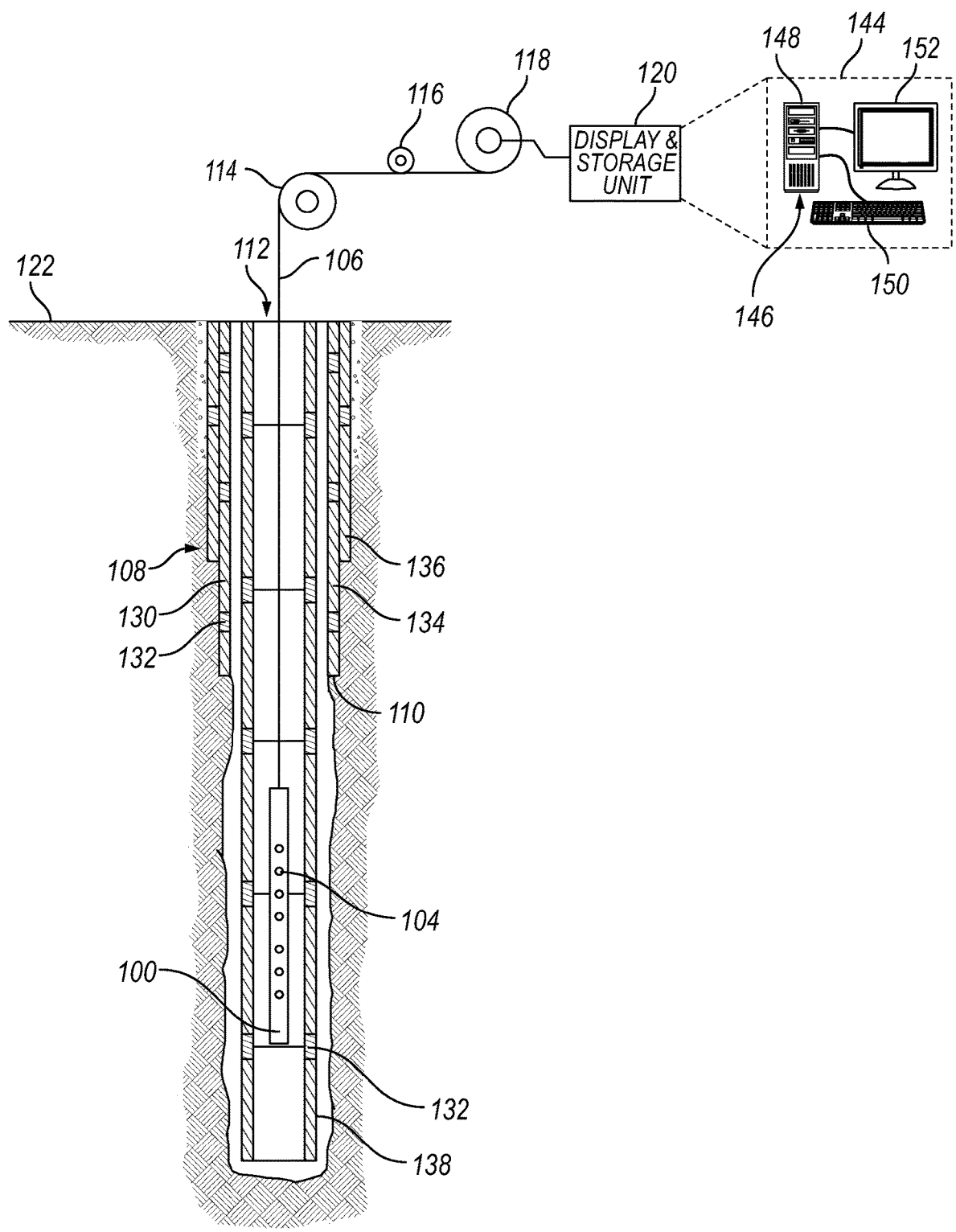
FIG. 1 illustrates a system including an acoustic logging tool.

FIG. 1 illustrates an operating environment for an acoustic logging tool 100 as disclosed herein in accordance with particular embodiments. Acoustic logging tool 100 may comprise a hydrophone 104. In examples, there may be any number of hydrophones 104, which may be disposed on acoustic logging tool 100. Acoustic logging tool 100 may be operatively coupled to a conveyance 106 (e.g., wireline, slickline, coiled tubing, pipe, downhole tractor, and/or the like) which may provide mechanical suspension, as well as electrical connectivity, for acoustic logging tool 100. Conveyance 106 and acoustic logging tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in the wellbore 110. Signals recorded by acoustic logging tool 100 may be stored on memory and then processed by display and storage unit 120 after recovery of acoustic logging tool 100 from wellbore 110. Alternatively, signals recorded by acoustic logging tool 100 may be conducted to display and storage unit 120 by way of conveyance 106. Display and storage unit 120 may process the signals, and the information contained therein may be displayed for an operator to observe and stored for future processing and reference. Alternatively, signals may be processed downhole prior to receipt by display and storage unit 120 or both downhole and at surface 122, for example, by display and storage unit 120. Display and storage unit 120 may also contain an apparatus for supplying control signals and power to acoustic logging tool 100. Typical casing string 108 may extend from wellhead 112 at or above ground level to a selected depth within a wellbore 110. Casing string 108 may comprise a plurality of joints 130 or segments of casing string 108, each joint 130 being connected to the adjacent segments by a collar 132. There may be any number of layers in casing string 108. For example, a first casing 134 and a second casing 136. It should be noted that there may be any number of casing layers.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. Acoustic logging tool 100 may be dimensioned so that it may be lowered into the wellbore 110 through pipe string 138, thus avoiding the difficulty and expense associated with pulling pipe string 138 out of wellbore 110.

In logging systems, such as, for example, logging systems utilizing the acoustic logging tool 100, a digital telemetry system may be employed, wherein an electrical circuit may be used to both supply power to acoustic logging tool 100 and to transfer data between display and storage unit 120 and acoustic logging tool 100. A DC voltage may be provided to acoustic logging tool 100 by a power supply located above ground level, and data may be coupled to the DC power conductor by a baseband current pulse system. Alternatively, acoustic logging tool 100 may be powered by batteries located within the downhole tool assembly, and/or the data provided by acoustic logging tool 100 may be stored within the downhole tool assembly, rather than transmitted to the surface during logging (corrosion detection).

As illustrated, one or more hydrophones 104 may be positioned on the acoustic logging tool 100. It should be understood that the configuration of acoustic logging tool 100 shown on FIG. 1 is merely illustrative and other configurations of acoustic logging tool 100 may be used with the present techniques. Hydrophone 104 may include any suitable acoustic receiver suitable for use downhole, including piezoelectric elements that may convert acoustic waves into an electric signal or hydrophones. Additionally, hydrophone 104 may be able to record any waves generated by leakage or other flow event inside and/or outside of the wellbore. In examples, hydrophone 104 may be disposed at any suitable location on acoustic logging tool 100. For example, hydrophones 104 may be disposed along the outer edge of acoustic logging tool 100 or within acoustic logging tool 100. Additionally, hydrophones 104 may be stacked along the longitudinal axis of acoustic logging tool 100 and/or one or more hydrophones 104 may be disposed circumferentially in a plane perpendicular to the longitudinal axis of acoustic logging tool 100.

Referring back to FIG. 1, the recordation of signals by hydrophones 104 may be controlled by display and storage unit 120, which may include an information handling system 144. As illustrated, the information handling system 144 may be a component of the display and storage unit 120. Alternatively, the information handling system 144 may be a component of acoustic logging tool 100. An information handling system 144 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price. Information handling system 144 may include a processing unit 146 (e.g., microprocessor, central processing unit, etc.) that may process EM log data by executing software or instructions obtained from a local non-transitory; computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with acoustic logging tool 100 and/or software executed by processing unit 146. For example, information handling system 144 may enable an operator to select analysis options, view collected log data, view analysis results, and/or perform other tasks.

Figure 2:
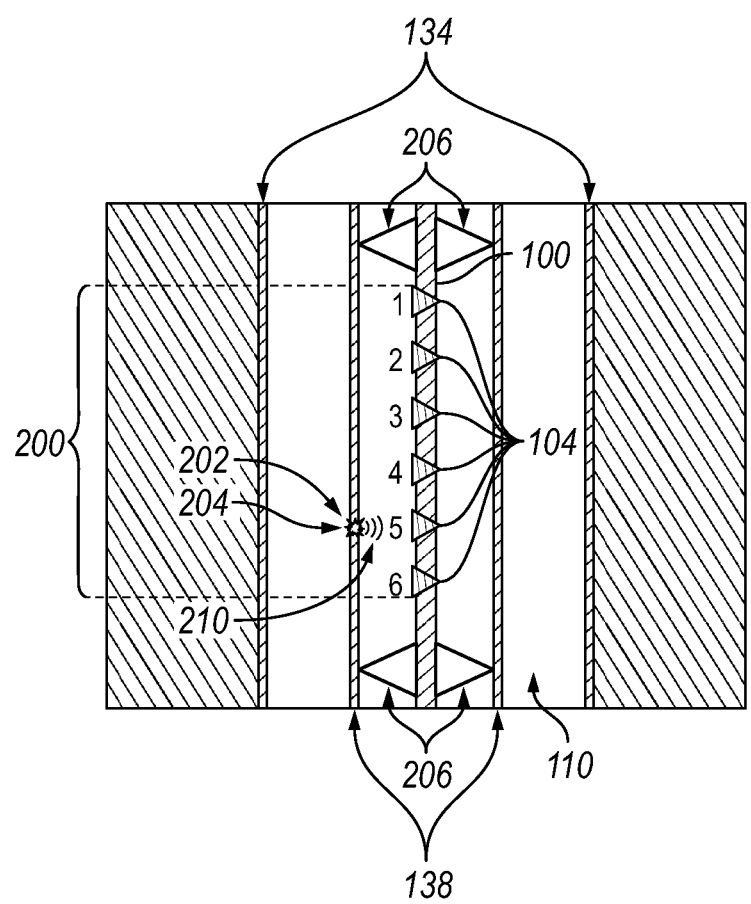
FIG. 2 illustrates an acoustic logging tool during measurement operations.

FIG. 2 illustrates acoustic logging tool 100 with a hydrophone array 200 in accordance with particular embodiments. Without limitation, there may be any number of hydrophones 104. As illustrated, the hydrophone array 200 includes a plurality of hydrophones 104 arranged longitudinally along the acoustic logging tool 100. During measurement operations acoustic logging tool 100 may detect the depth and radial location of leak 202 and/or flow of fluid 204 in wellbore 110. In examples, acoustic logging tool 100 may be deployed with one or more stabilizers 206 installed above or below acoustic logging tool 100. As illustrated in FIG. 2, and discussed above, acoustic logging tool 100 may be disposed in pipe string 138, which may be disposed in a first casing 134. During operations, each hydrophone 104 of hydrophone array 200 may sense and record any number of acoustic signals and/or vibrations continuously as acoustic logging tool 100 moves up or down wellbore 110 within pipe string 138. The recorded acoustic signals and/or vibrations may be identified as acoustic data. The acoustic data may be transmitted to information handling system 144, which may process each recorded acoustic signal with a beamforming algorithm to identify the location of the acoustic source. In examples, the acoustic source may be a leak 202 caused by flow of fluid 204 in leak 202. Fluid 204 may be flowing from outside pipe string 138 and into pipe string 138, or vice versa. Likewise, fluid 204 may be moving from outside of first casing 134 and into first casing 134, or vice versa. This is true for any casing that may be outside of first casing 134. To properly process acoustic noise, beamforming may be used. Beamforming is a signal processing technique used in hydrophone array 200 for directional signal transmission or reception. This is achieved by combining waveforms by a phased array in such a way that signals at particular angles experience constructive interference while others experience destructive interference.

The data recorded by acoustic logging tool 100 (e.g., referring to FIG. 1) may generally be referred to as an acoustic data set. To localize the noise sources with a beamforming type of technique, three or more hydrophones 104 may be utilized to capture and record acoustic noise from the noise sources, which is defined as noise data. Noise data, which may be captured in the acoustic data set, may be processed using information handling system 144, which may be communicatively connected to acoustic logging tool 100. Waveforms, which comprise the acoustic data set, are captured and recorded by received hydrophone 104. In examples, waveforms may originate from the noise source and may be noise waveforms that form noise data. The waveforms may be identified in Equation (1) as j and may be annotated as:

$$w_{ij}(t) = A(i) \cdot G_{ij}(t) * s_i(t) \quad (1)$$

The noise source at location i may be represented as a function $s_i(t)$. $w_{ij}(t)$ is the waveform. $A(i)$ is the source strength of the noise sources at location i. $G_{ij}(t)$ is the Green's function between the source i and receiver j. The * represents a convolution operation. The Green's function is determined by the acoustic property of the medium.

Figure 3A:
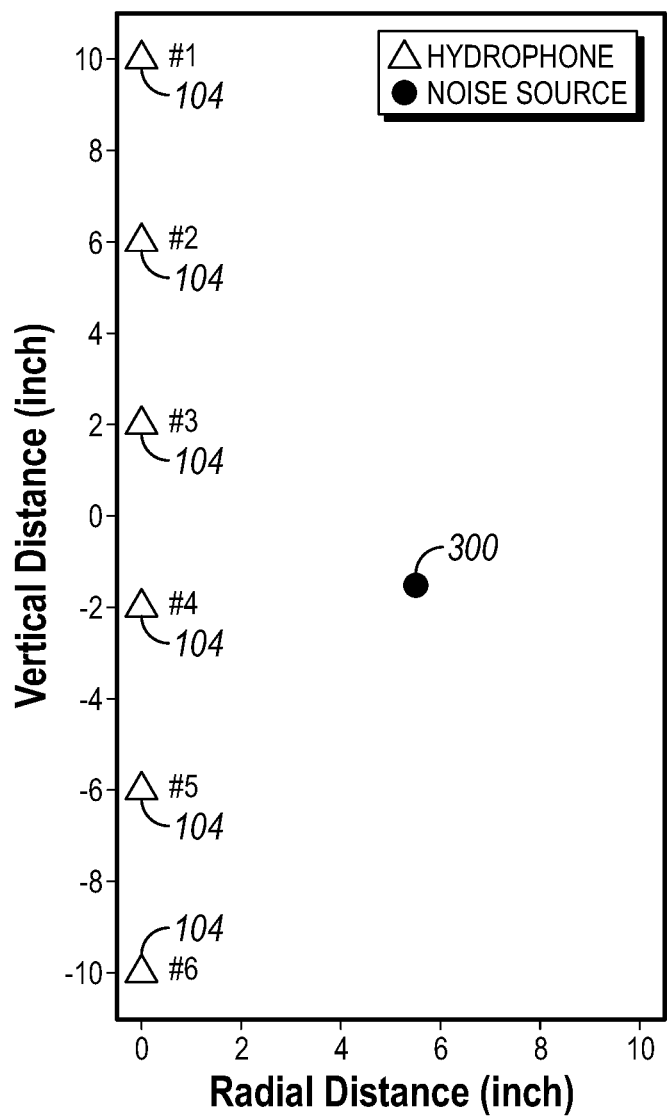
FIGS. 3A-3C are graphs that illustrate an example of recording a noise source with an acoustic logging tool.
Figure 3B:
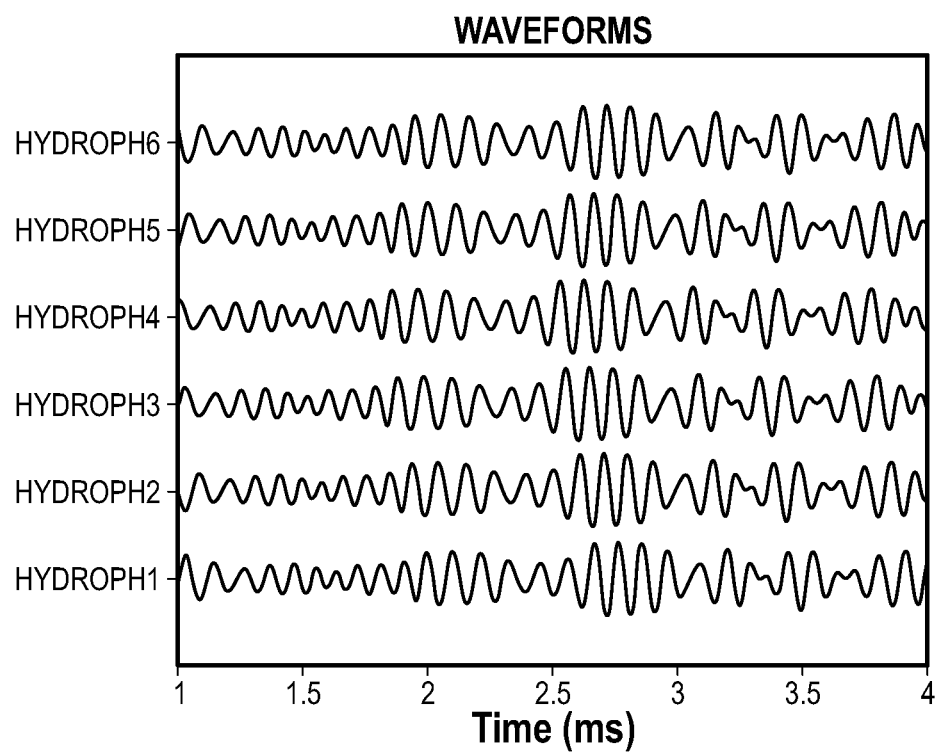
Figure 3C:
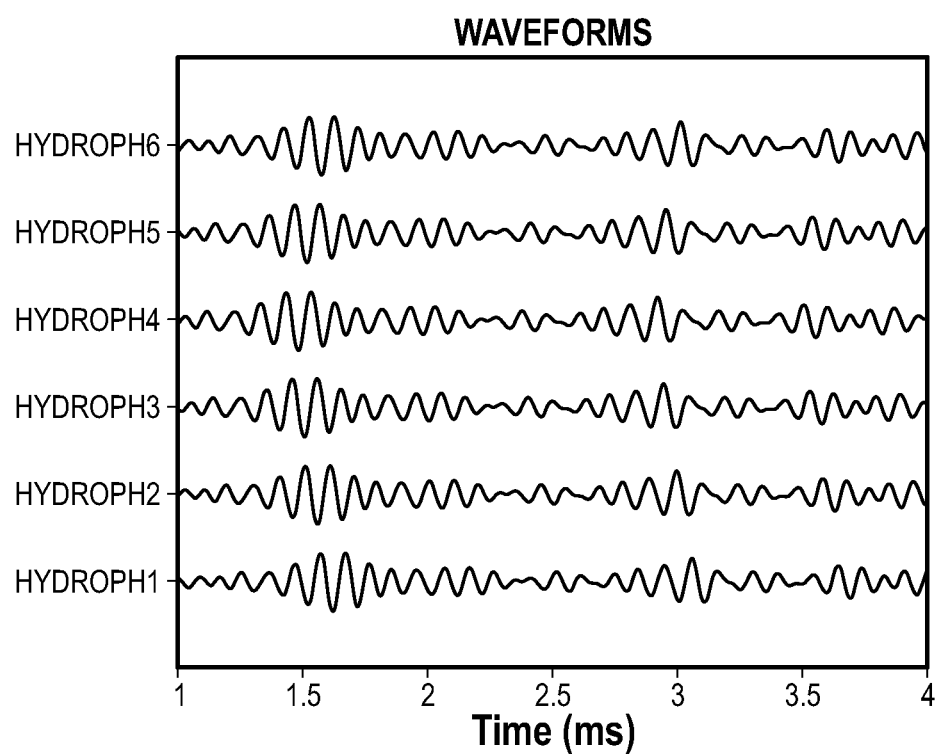

FIGS. 3A-3C are graph illustrating measurement operations using six hydrophones 104 (e.g., referring to FIG. 2). FIG. 3A is a graph illustrating a location of the six hydrophones 104 and a noise source 300. FIG. 3B is a graph illustrating waveforms received by each of the six hydrophones 104 from a randomly generated white noise source filtered at 8-12 KHz. FIG. 3C is a graph illustrating waveforms received by each of the six hydrophones 104 from another randomly generated process. In this example, the noise source is a randomly generated Gaussian white noise. The waveforms may be filtered with an 8-12 kHz filter, using information handling system 144 (e.g., referring to FIG. 1), to simulate a noise source 300 at this frequency range.

The cross-correlation functions between each hydrophone pair from the waveforms may be computed by information handling system 144 (e.g., referring to FIG. 1) using Equation (2) below:

$$CC_{ijk}(\tau)=w_{ij}(t)*w_{ij}(t) \quad (2)$$

$CC_{ijk}(\tau)$ represents the cross-correlation functions between hydrophones 104 j and k for the noise source i. $w_{ij}(t)$ is the waveform from the noise source to a first hydrophone 104 and $w_{ik}(t)$ is the waveform from the noise source to a second hydrophone 104. $\tau$ is the delay time. The * represents a cross-correlation operation.

Figure 4:
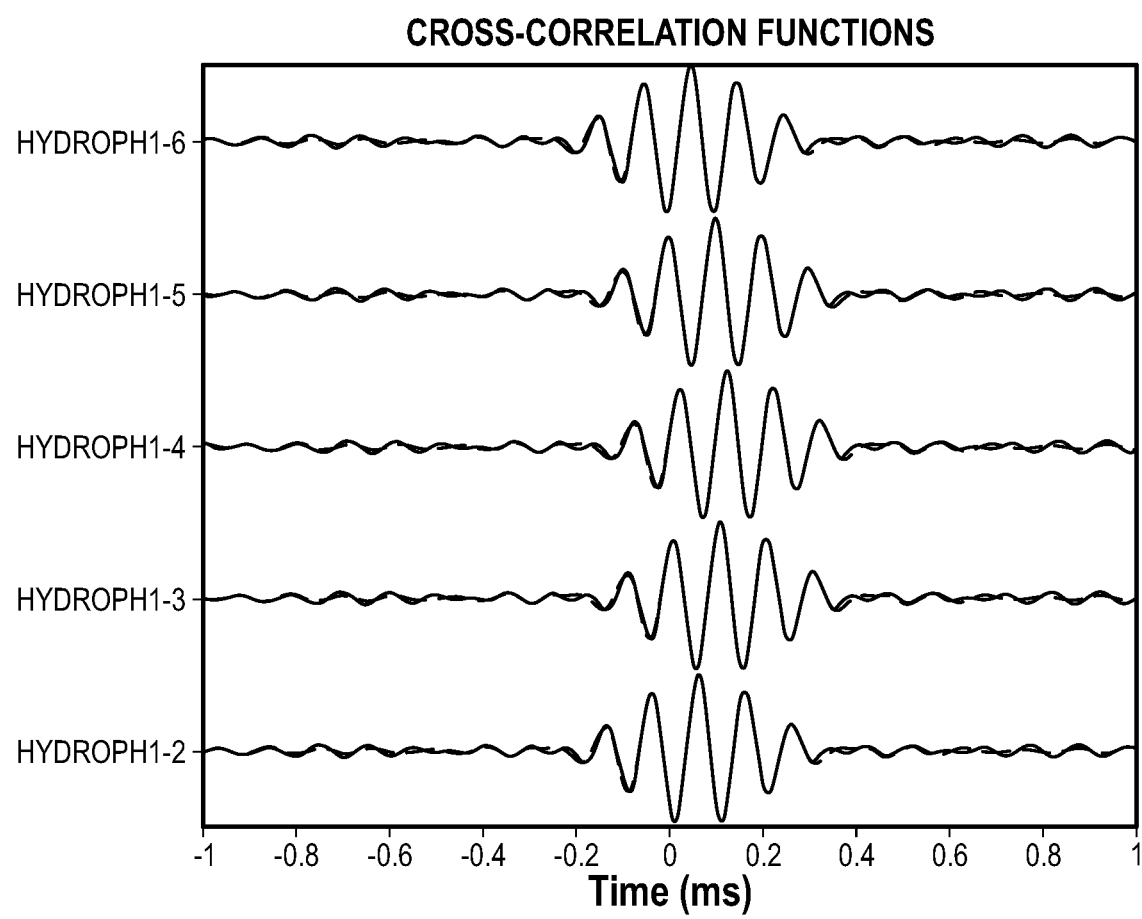
FIG. 4 illustrates a graph of performing a cross-correlation function between two or more hydrophones.

FIG. 4 illustrates a graph, in which the cross-correlation functions are plotted between hydrophone 1 and 2, 1 and 3, 1 and 4, 1 and 5, and 1 and 6. As illustrated in the graph, the cross-correlations functions of the waveforms from two different random processes may be nearly identical. This is because the autocorrelation function of a Gaussian white noise is a Dirac delta function, irrelevant to the random process of the white noise. Therefore, the cross-correlation functions are not sensitive to a source signature. This proves that the predicted cross-correlation functions may be computed for a point source at any location if either the source function $s_i(t)$ is known or the property of the source mathematically satisfies that the auto-correlation of the source is irrelevant to function $s_i(t)$. Thus, the cross-correlation functions may be calculated for waveforms generated with sources at two different locations, respectively.

Figure 5A:
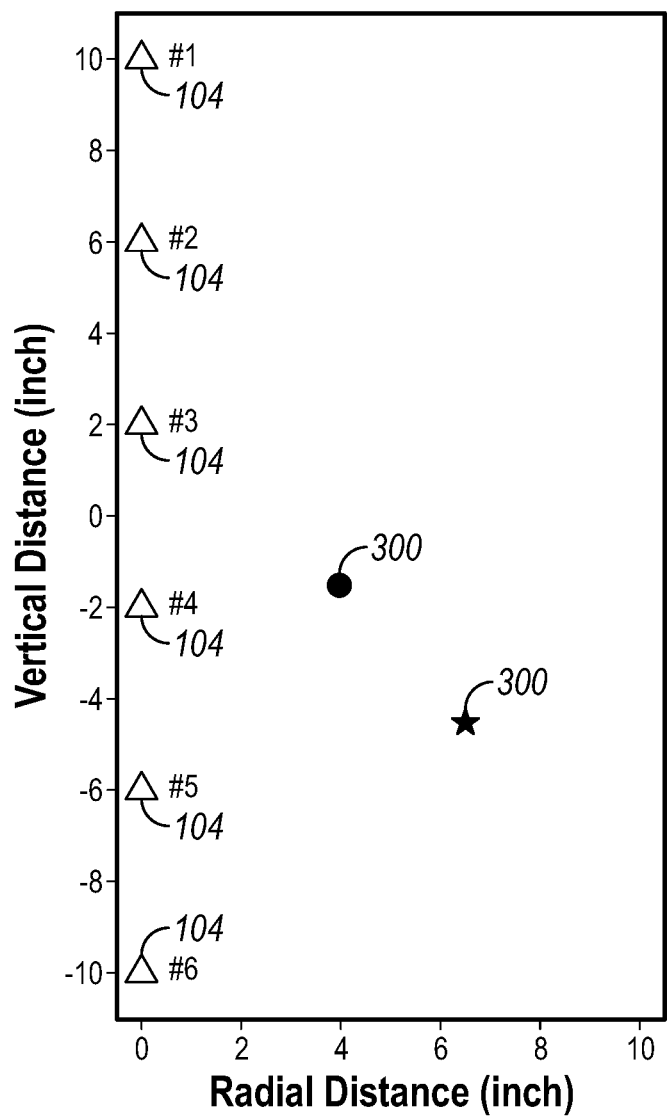
FIGS. 5A and 5B are graphs that illustrates an example of recording two or more noise sources with an acoustic logging tool.
Figure 5B:
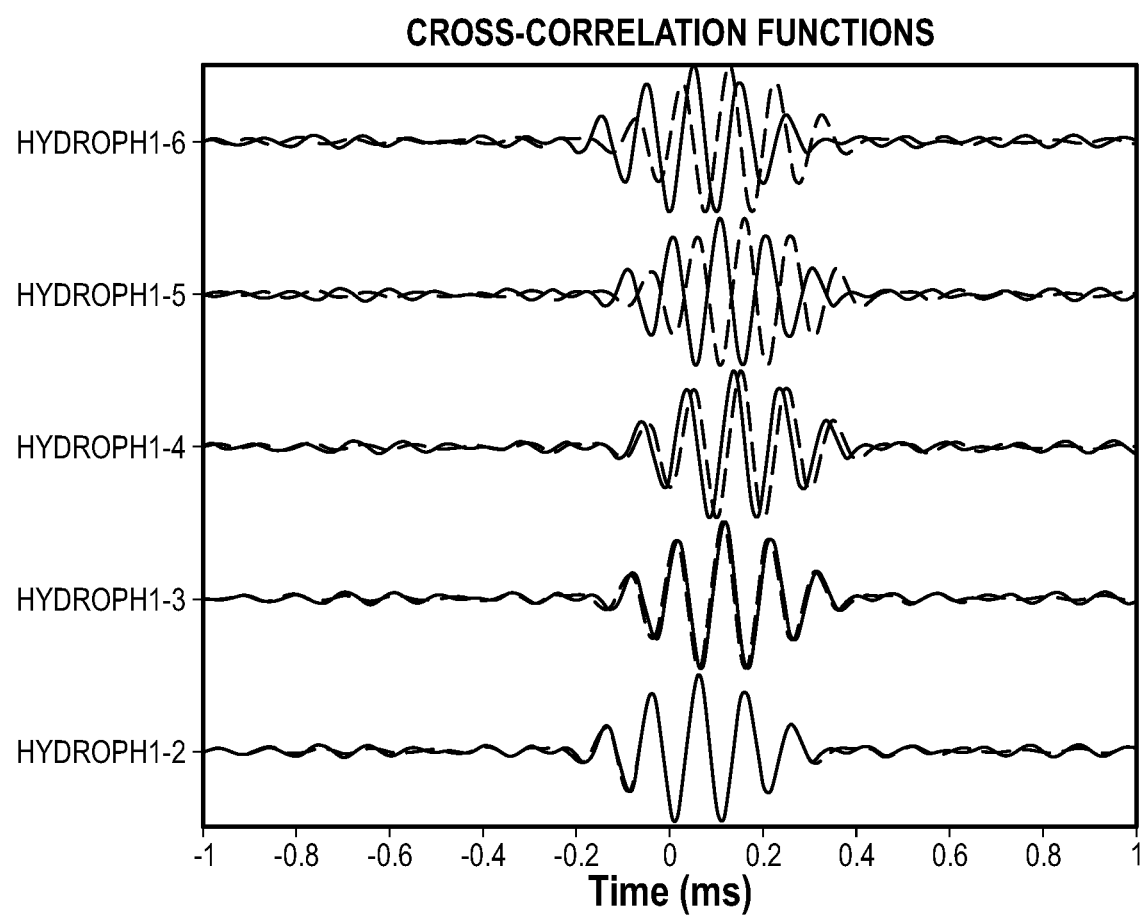

FIGS. 5A and 5B are graphs that show the cross-correlations functions of hydrophones 104 may be different when the locations of noise sources 300 are different. This shows that the cross-correlation functions are sensitive to locations of noise sources 300. During measurement operations, a fluid flow may generate a distributed acoustic noise source besides a single point noise source 300. The acoustic field of the distributed noise source 300 may be simulated by the linear superposition of acoustic fields from individual point sources in the distribution area. Therefore, a waveform received by a hydrophone j from a distributed source $s_a$ may be represented as $$w_{aj}=w_{Aj}=\Sigma_{i=1}^{N}A(i) \cdot G_{ij}(t)*s_i(t) \quad (3)$$

$s_a$ is a distributed acoustic source in the area a. The area a may be represented by discrete N point sources. $A(i)$ is the source strength at location i. In examples, the distributed source may be spread in more than one continuous area a. Thus, a may be a continuous area or multiple detached areas. The cross-correlation functions between each hydrophone pair may be computed as $$CC_{Ajk}(\tau)=w_{Aj}(t)*w_{Ak}(t) \quad (4)$$

The predicted cross-correlation functions may be computed for a distributed acoustic source of any area if either the source function $s_i(t)$ is known or the property of the source mathematically satisfies that (1) the auto-correlation of the source is irrelevant to the function $s_i(t)$ and (2) $s_1(t)$, $s_2(t)$, . . . $s_N(t)$ are mutually independent. The predicted cross-correlation is denoted as $CC_{Ajk}^{Pred}(\tau)$, for a source distribution. The predicted cross-correlations $CC_{Ajk}^{Pred}(\tau)$ may be obtained from analytic Equations (3) and (4), computational simulations, or laboratory experiments. In the event of colored noise, wherein the frequency spectrum is not balanced, a whitening or a spectrum-shaping technique may be applied to flatten the spectrum within the frequency band defined in the above filtering process. Colored noise is defined as any kind of noise signal that is not white noise. White noise is defined as a random signal having equal intensity at different frequencies, giving it a constant power spectral density. A whitening or spectrum-shaping technique equalizes the spectrum of a signal, making it similar to the white noise spectrum. The technique works by enhancing low level spectral components and attenuates high level ones.

Figure 6A:
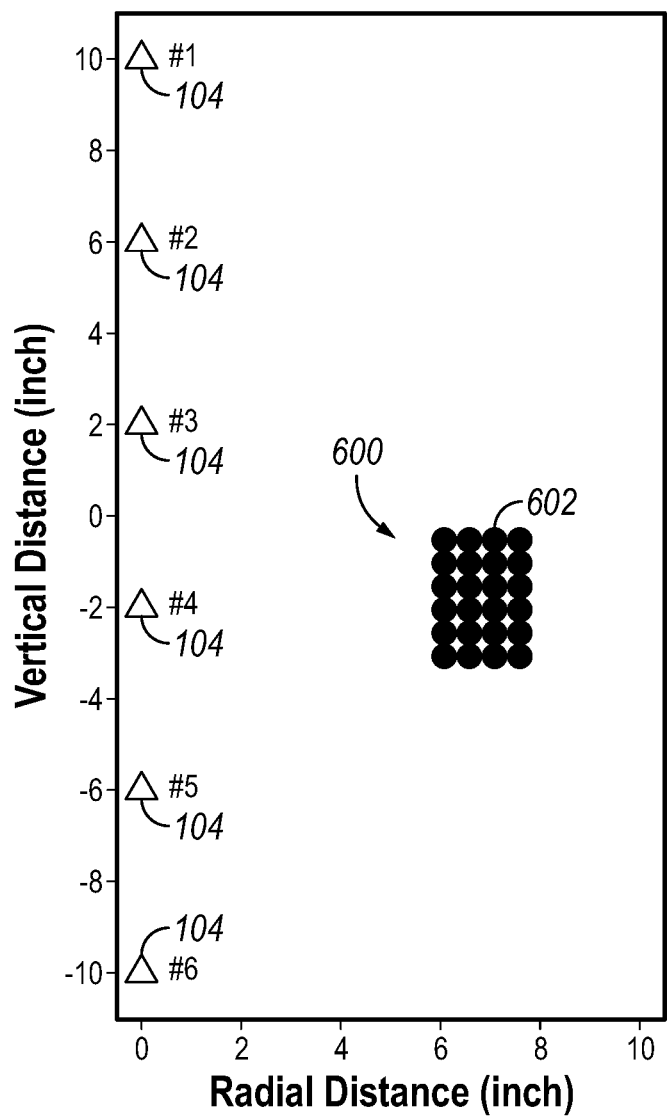
FIGS. 6A-6C are graphs that illustrate an example of recording a distributed source with an acoustic logging tool.
Figure 6B:
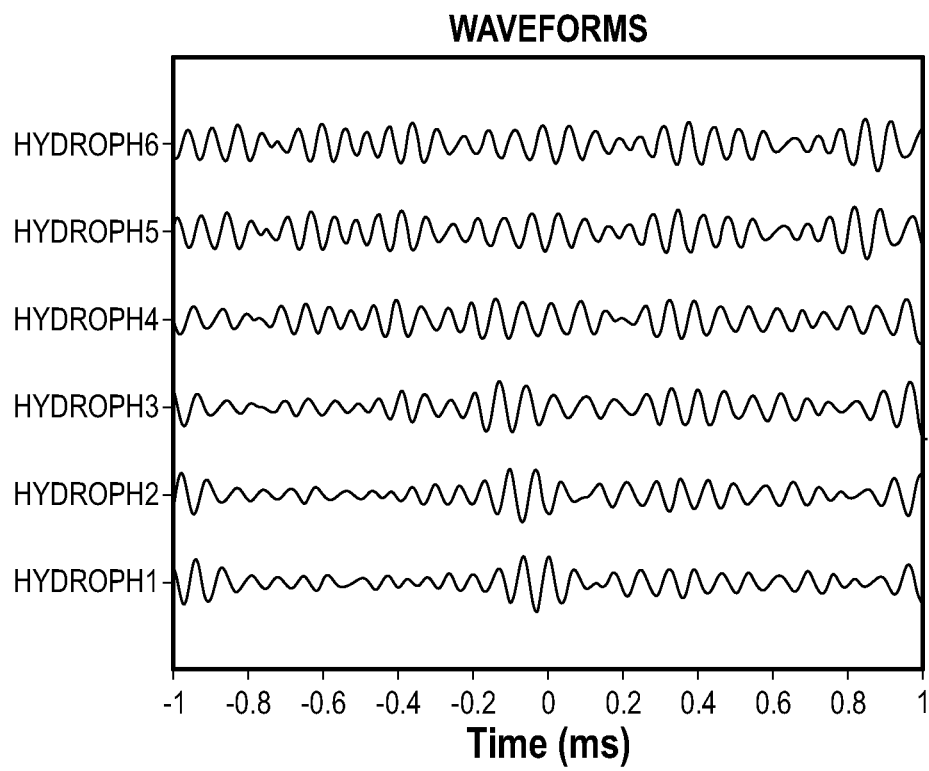
Figure 6C:
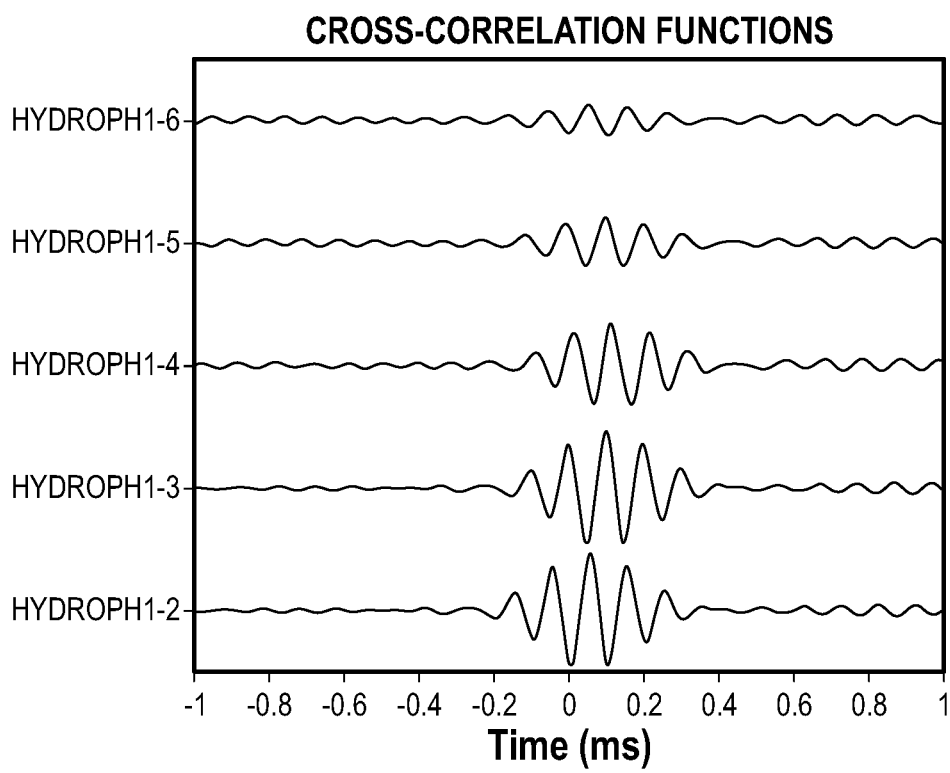

FIGS. 6A-6C are graphs that illustrate waveforms generated by a distributed acoustic noise source 600 that are captured and recorded by one or more hydrophones 104. A plurality of Point sources 602 may simulate distributed acoustic noise source 600. Waveforms received by six hydrophones 104 are plotted in Figured 6B and the cross-correlation functions between hydrophone 1 and 2, 1 and 3, 1 and 4, 1 and 5, and 1 and 6 are plotted in FIG. 6C. As illustrated, measurement operations may comprise noise data recorded by acoustic logging tool 100 (e.g., referring to FIG. 1), such as seen in FIG. 6B, and calculation of the cross-correlation functions between hydrophone pairs by information handling system 144 (e.g., referring to FIG. 4C), as seen in FIG. 6C. These cross-correlation functions may be referred to as measured cross-correlation function $CC_{jk}^{Meas}(\tau)$. Distributed acoustic noise source 600, a source distribution illustrated in FIG. 6A, may be unknown, and may be inverted. To invert the source distribution, a cost function may be constructed using predicted cross-correlations functions and measured cross-correlation functions, as seen in Equation (5).

$$\text{cost}=\Sigma_{j=1}^{M}\Sigma_{k=1}^{M,k\neq j}f(CC_{Ajk}^{Pred}(\tau),CC_{jk}^{Meas}(\tau))+\lambda \cdot g(A) \quad (5)$$

M is the number of hydrophones. $f$ is a misfit function. g is a regularization function. $\lambda$ is a tuning parameter. A is the noise source strength distribution.

The misfit function $f$ may be calculated as a L2 norm. The L2 norm calculates the distance of a vector coordinate from the origin of the vector space. As such, it is also known as the Euclidean norm as it is calculated as the Euclidean distance from the origin. Specifically, the misfit function $f$ may be the squared L2 norm of amplitude difference of partial/full cross-correlation functions, the squared L2 norm of travel time difference of one or more phases of the cross-correlation functions, or the squared L2 norm of envelope difference of partial/full cross-correlation functions.

The squared L2 norm of amplitude difference of partial/full cross-correlation functions is defined from the cross-correlation functions that are represented as $CC_{Ajk}^{Pred}(\tau)$ and $CC_{jk}^{Meas}(\tau)$ in Equations (5) and (6). The amplitude difference is calculated as $CC_{Ajk}^{Pred}(\tau)-CC_{jk}^{Meas}(\tau)$. This difference is a vector because $\tau$ is a vector. The squared L2 norm of this vector may then be calculated and the vector or the entire vector may be utilized to calculate the squared L2 norm. The squared L2 norm of travel time difference of one or more phases of the cross-correlation function may be measured using Frequency-Time analysis. The squared L2 norm of envelop difference of partial/full cross-correlation functions may be calculated using a Hilbert transform.

The regularization function g may be the L1 or squared L2 norm of the source strength A, or the L1 or squared L2 norm of the derivatives of source strength A. The A is the source strength in Equation 1. A is a function of location, representing the source strength at each location. As A is a function of location, the derivatives are computed spatially. The derivatives may be the first derivative or the second derivative.

The L1 Norm is the sum of the magnitudes of a vector in a vector space. The source strength A may be solved by minimizing the cost function using the gradient descent method, stochastic gradient descent method, or a closed-form solution if the squared L2 norm is adopted as the regularization function. The source strength A may be solved using the coordinate descent method if the L1 norm is adopted as the regularization function. By applying a squared L2 norm of amplitude difference as the misfit function and squared L2 norm of the source strength A as the regularization function, Equation (5) may be re-written as $$\text{cost} = \sum_{j=1}^{M} \sum_{k=1}^{M,k\ne j} \|CC_{Ajk}^{Pred}(\tau) - CC_{jk}^{Meas}(\tau)\|_2^2 + \lambda \cdot \|A\|_2^2 \quad (6)$$

Figure 7B:
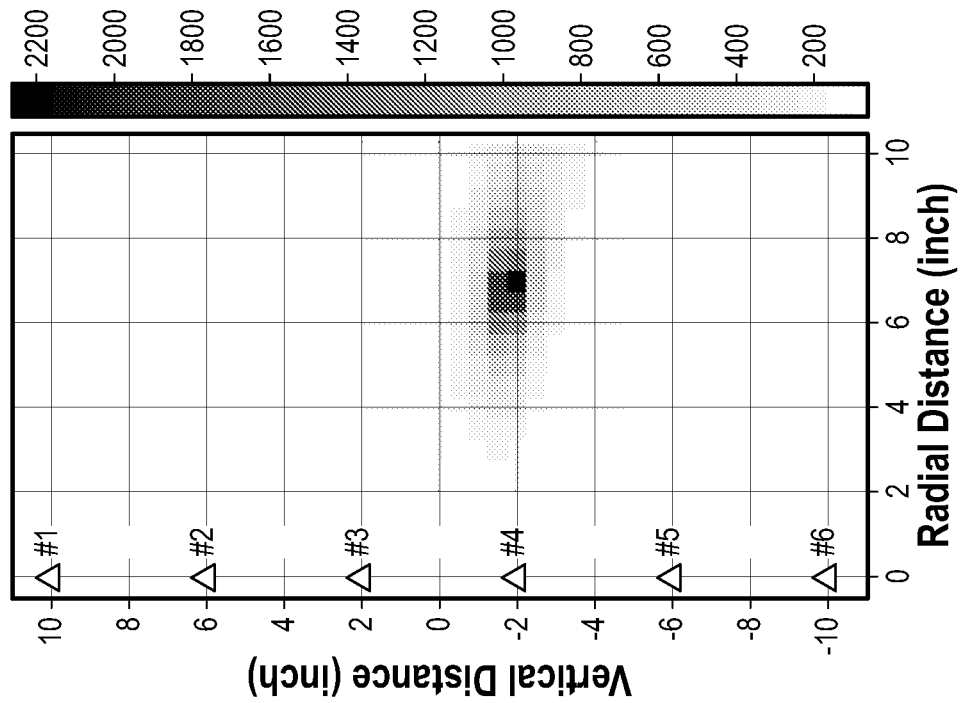
FIG. 7B is a graph showing source localization with a beamforming method.
Figure 7A:
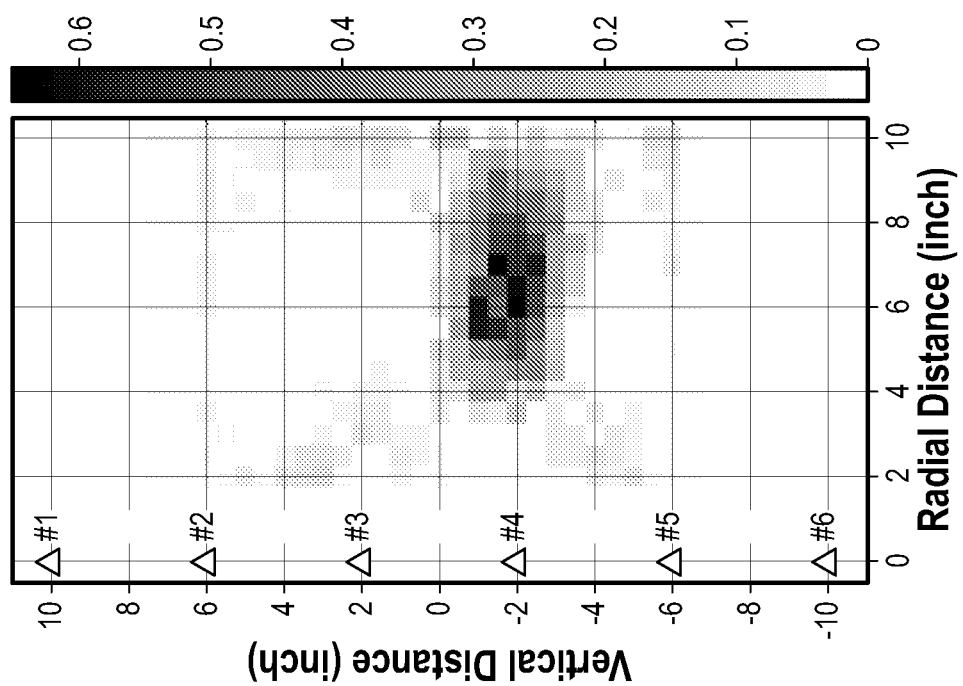
FIG. 7A is a graph showing source localization utilizing a cross-correlation method.

Thus, a least-square inversion problem may be solved. FIG. 7A is a graph illustrating results of using the closed-form solution approach to invert for the source strength A. This approach is proven from the computation modeling better than the beamforming technique as illustrated in FIG. 7B for one or multiple distributed noise source distribution.

Figure 8:
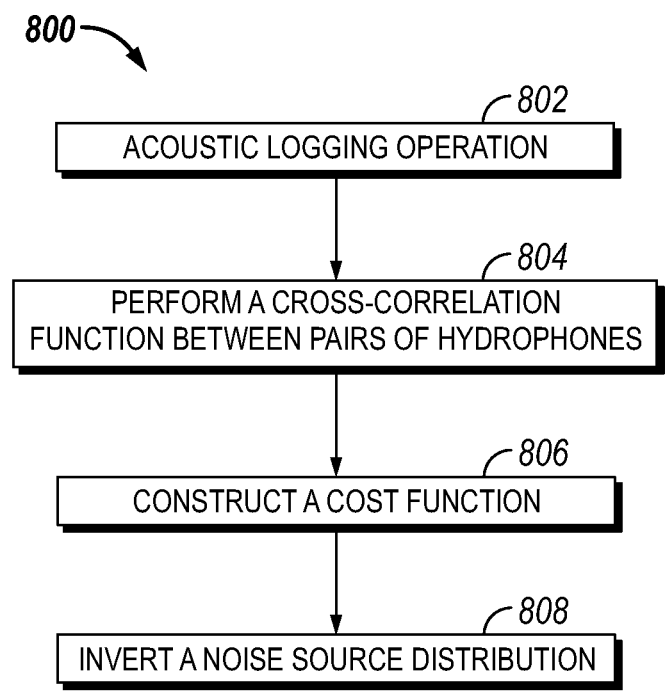
FIG. 8 illustrates a workflow 800 for identifying a noise source localization based on cross-correlation functions

FIG. 8 illustrates a workflow 800 for identifying a noise source localization based on cross-correlation functions. Workflow 800 may begin with block 802, in which an acoustic logging operation is performed. During the acoustic logging operation (i.e., measurement operation) acoustic logging tool 100 may be disposed in wellbore 110 to perform the acoustic logging operation with at least three hydrophones 104 (e.g., referring to FIG. 1) to capture and/or record acoustic noises downhole as a data set (i.e., acoustic measurements). The data set may be sent to an information handling system 144 (e.g., referring to FIG. 1) that may be disposed on acoustic logging tool 100 and/or communicatively coupled to an information handling system 144 disposed at the surface. In block 804, a cross-correlation function may be performed between pairs of hydrophones using the data set from block 802. In block 806 a cost function is constructed. The cost function may be Equation (5), discussed above, which may be created using the measured cross-correlation functions from block 804 and the predicted cross-correlation functions. The cost function may comprise of a misfit function and a regularization function. The misfit function $f$ may be the squared L2 norm of amplitude difference of partial/full cross-correlation functions, the squared L2 norm of travel time difference of one or more phases of the cross-correlation functions, or the squared L2 norm of envelope difference of partial/full cross-correlation functions. The regularization function g may be the L1 or squared L2 norm of the noise source strength A, or the L1 or squared L2 norm of the derivatives of the noise source strength A. Additionally, the predicted cross-correlation functions may be obtained from analytic Equations (3) and (4), computational simulations, or laboratory experiments. In block 808 a noise source distribution is inverted by solving the cost function in block 806. This may be solved where the source strength A may be solved by minimizing the cost function using gradient descent method, stochastic gradient descent method, or closed-form solution, if the squared L2 norm is adopted as the regularization function. The source strength A may be solved using the coordinate descent method if the L1 norm is adopted as the regularization function.

Improvements over current technology may be found in that the current source localization technology (i.e., Beamforming) is based on a single point source assumption. The performance of the current technology will degrade when there are sources at more than one location during a measurement operations. The methods and systems discussed above are able to identify sources at more than one location without degrading measurements and/or images.

The systems and methods may include any of the various features disclosed herein, including one or more of the following statements.

Statement 1: A method for acoustic noise source detection may comprise disposing an acoustic logging tool into a wellbore, performing an acoustic logging operation in the wellbore with the acoustic logging tool, and forming an acoustic data set from the acoustic logging operation. The method may further comprise performing a cross-correlation function between pairs of hydrophones using the acoustic data set, constructing a cost function using at least in part the cross-correlation function to find a noise source distribution, and identifying a location of the acoustic noise source by inverting the noise source distribution.

Statement 2: The method of statement 1, wherein the acoustic data set comprises a plurality of waveforms.

Statement 3: The method of statement 2, wherein at least one of the plurality of waveforms is from a noise source.

Statement 4: The method of statement 3, wherein the plurality of waveforms are annotated as $w_{ij}(\tau)=A(i) \cdot G_{ij}(t) * s_i(t)$, where $s_i(t)$ is the noise source, $w_{ij}(t)$ is the waveform, $A(i)$ is the source strength of the noise source, $G_{ij}(t)$ is the Green's function between the noise source location i and at least one of the pair of hydrophones j.

Statement 5: The method of statements 1 or 2, wherein the cross-correlation function is annotated as $CC_{ijk}(\tau)=w_{ij}(t)*w_{ik}(t)$, where $CC_{ijk}(\tau)$ is the cross-correlation function between the pair of hydrophones j and k for a noise source i, $w_{ij}(t)$ is a first waveform from a noise source to a first hydrophone of the pair of hydrophones, $w_{ik}(t)$ is the second waveform from the noise source to a second hydrophone of the pair of hydrophones, and $\tau$ is a delay time.

Statement 6: The method of statement 5, wherein the cross-correlation function is annotated as $\text{cost}=\sum_{j=1}^{M} \sum_{k=1}^{M,k\ne j} f(CC_{Ajk}^{Pred}(\tau), CC_{jk}^{Meas}(\tau))+\lambda \cdot g(A)$, where M is the number of hydrophones, $f$ is a misfit function, g is a regularization function, $\lambda$ is a tuning parameter, and A is the noise source strength distribution.

Statement 7: The method of statements 1, 2, or 5, wherein the cost function further comprises a misfit function.

Statement 8: The method of statement 7, wherein the cost function further comprises a regularization function.

Statement 9: The method of statement 7, wherein the misfit function is a squared L2 norm of an amplitude difference, the squared L2 norm of a travel time difference of one or more phases of the cross-correlation functions, or the squared L2 norm of an envelope difference.

Statement 10: The method of statement 8, wherein regularization function is a L1 norm or a squared L2 norm of a noise source strength A, or the L1 norm or the squared L2 norm of the derivatives of the noise source strength A.

Statement 11: A system for acoustic noise source detection comprising an acoustic logging tool to take one or more acoustic measurements in a wellbore. The system may further comprise an information handling system configured to form an acoustic data set from the one or more acoustic measurements, perform a cross-correlation function between pairs of hydrophones using the acoustic data set, construct a cost function using at least in part the cross-correlation function to find a noise source distribution and identify a location of the acoustic noise source by inverting the noise source distribution.

Statement 12: The system of statement 11, wherein the acoustic data set comprises a plurality of waveforms.

Statement 13: The system of statement 12, wherein at least one of the plurality of waveforms is from a noise source.

Statement 14: The system of statement 13, wherein the plurality of waveforms are annotated as $w_{ij}(t)=A(i)\cdot G_{ij}(t)*s_i(t)$, where $s_i(t)$ is the noise source, $w_{ij}(t)$ is the waveform, $A(i)$ is the source strength of the noise source, $G_{ij}(t)$ is the Green's function between the noise source location i and at least one of the pair of hydrophones j.

Statement 15: The system of statements 11 or 12, wherein the cross-correlation function is annotated as $CC_{ijk}(\tau)=w_{ij}(t)*w_{ik}(t)$, where $CC_{ijk}(\tau)$ is the cross-correlation function between the pair of hydrophones j and k for a noise source i, $w_{ij}(t)$ is a first waveform from a noise source to a first hydrophone of the pair of hydrophones, $w_{ik}(t)$ is the second waveform from the noise source to a second hydrophone of the pair of hydrophones, and $\tau$ is a delay time.

Statement 16: The system of statement 15, wherein the cross-correlation function is annotated as $\text{cost}=\Sigma_{j=1}^{M}\Sigma_{k=1}^{M,k\neq j}f(CC_{Ajk}^{Pred}(\tau),CC_{jk}^{Meas}(\tau))+\lambda\cdot g(A)$, where M is the number of hydrophones, $f$ is a misfit function, g is a regularization function, $\lambda$ is a tuning parameter, and A is the noise source strength distribution.

Statement 17: The system of statements 11, 12, or 15, wherein the cost function further comprises a misfit function.

Statement 18: The system of statements 17, wherein the cost function further comprises a regularization function.

Statement 19: The system of statement 17, wherein the misfit function is a squared L2 norm of an amplitude difference, the squared L2 norm of a travel time difference of one or more phases of the cross-correlation functions, or the squared L2 norm of an envelope difference.

Statement 20: The system of statements 18, wherein regularization function is a L1 norm or a squared L2 norm of a noise source strength A, or the L1 norm or the squared L2 norm of the derivatives of the noise source strength A.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for acoustic noise source detection comprising:
    disposing an acoustic logging tool into a wellbore;
    performing an acoustic logging operation in the wellbore with the acoustic logging tool;
    forming an acoustic data set from the acoustic logging operation;
    performing a cross-correlation function between pairs of hydrophones using the acoustic data set;
    constructing a cost function using at least in part the cross-correlation function to find a noise source distribution; and
    identifying a location of the acoustic noise source by inverting the noise source distribution.

2. The method of claim 1, wherein the acoustic data set comprises a plurality of waveforms.

3. The method of claim 2, wherein at least one of the plurality of waveforms is from a noise source.

4. The method of claim 3, wherein the plurality of waveforms are annotated as $w_{ij}(t)=A(i)\cdot G_{ij}(t)*s_i(t)$, where $s_i(t)$ is the noise source, $w_{ij}(t)$ is the waveform, $A(i)$ is the source strength of the noise source, $G_{ij}(t)$ is the Green's function between the noise source location i and at least one of the pair of hydrophones j.

5. The method of claim 1, wherein the cross-correlation function is annotated as $CC_{ijk}(\tau)=w_{ij}(t)*w_{ik}(t)$, where $CC_{ijk}(\tau)$ is the cross-correlation function between the pair of hydrophones j and k for a noise source i, $w_{ij}(t)$ is a first waveform from a noise source to a first hydrophone of the pair of hydrophones, $w_{ik}(t)$ is the second waveform from the noise source to a second hydrophone of the pair of hydrophones, and $\tau$ is a delay time.

6. The method of claim 5, wherein the cross-correlation function is annotated as $\text{cost}=\Sigma_{j=1}^{M}\Sigma_{k=1}^{M,k\neq j}f(CC_{Ajk}^{Pred}(\tau),CC_{jk}^{Meas}(\tau))+\lambda\cdot g(A)$, where M is the number of hydrophones, $f$ is a misfit function, g is a regularization function, $\lambda$ is a tuning parameter, and A is the noise source strength distribution.

7. The method of claim 1, wherein the cost function further comprises a misfit function.

8. The method of claim 7, wherein the cost function further comprises a regularization function.

9. The method of claim 8, wherein regularization function is a L1 norm or a squared L2 norm of a noise source strength A, or the L1 norm or the squared L2 norm of the derivatives of the noise source strength A.

10. The method of claim 7, wherein the misfit function is a squared L2 norm of an amplitude difference, the squared L2 norm of a travel time difference of one or more phases of the cross-correlation functions, or the squared L2 norm of an envelope difference.

11. A system for acoustic noise source detection comprising:
   an acoustic logging tool to take one or more acoustic measurements in a wellbore;
   an information handling system configured to:
      form an acoustic data set from the one or more acoustic measurements;
      perform a cross-correlation function between pairs of hydrophones using the acoustic data set;
      construct a cost function using at least in part the cross-correlation function to find a noise source distribution; and
      identify a location of the acoustic noise source by inverting the noise source distribution.

12. The system of claim 11, wherein the acoustic data set comprises a plurality of waveforms.

13. The system of claim 12, wherein at least one of the plurality of waveforms is from a noise source.

14. The system of claim 13, wherein the plurality of waveforms are annotated as $w_{ij}(t)=A(i) \cdot G_{ij}(t)*s_i(t)$, where $s_i(t)$ is the noise source, $w_{ij}(t)$ is the waveform, $A(i)$ is the source strength of the noise source, $G_{ij}(t)$ is the Green's function between the noise source location i and at least one of the pair of hydrophones j.

15. The system of claim 11, wherein the cross-correlation function is annotated as $CC_{ijk}(\tau)=w_{ij}(t)*w_{ik}(t)$, where $CC_{ijk}(\tau)$ is the cross-correlation function between the pair of hydrophones j and k for a noise source i, $w_{ij}(t)$ is a first waveform from a noise source to a first hydrophone of the pair of hydrophones, $w_{ik}(t)$ is the second waveform from the noise source to a second hydrophone of the pair of hydrophones, and t is a delay time.

16. The system of claim 15, wherein the cross-correlation function is annotated as $cost=\sum_{j=1}^{M}\sum_{k=1}^{M,k\neq j}f(CC_{Ajk}^{Pred}(\tau), CC_{jk}^{Meas}(\tau))+\lambda \cdot g(A)$, where M is the number of hydrophones, $f$ is a misfit function, g is a regularization function, $\lambda$ is a tuning parameter, and A is the noise source strength distribution.

17. The system of claim 11, wherein the cost function further comprises a misfit function.

18. The system of claim 17, wherein the cost function further comprises a regularization function.

19. The system of claim 18, wherein regularization function is a L1 norm or a squared L2 norm of a noise source strength A, or the L1 norm or the squared L2 norm of the derivatives of the noise source strength A.

20. The system of claim 17, wherein the misfit function is a squared L2 norm of an amplitude difference, the squared L2 norm of a travel time difference of one or more phases of the cross-correlation functions, or the squared L2 norm of an envelope difference.

* * * * *